US010313434B2

(12) United States Patent
Ran et al.

(10) Patent No.: US 10,313,434 B2
(45) Date of Patent: Jun. 4, 2019

(54) METHOD AND DEVICE FOR MESSAGE SYNCHRONIZATION (71) Applicant: TENCENT TECHNOLOGY (SHENZHEN) COMPANY LIMITED, Shenzhen (CN)

(72) Inventors: Xiaokang Ran, Shenzhen (CN); Jia Sun, Shenzhen (CN); Tao Cao, Shenzhen (CN); Wei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 152 days.

(21) Appl. No.: 15/158,669

(22) Filed: May 19, 2016

(65) Prior Publication Data
US 2016/0269483 A1   Sep. 15, 2016

Related U.S. Application Data (63) Continuation of application No. PCT/CN2014/091584, filed on Nov. 19, 2014.

(30) Foreign Application Priority Data

Nov. 20, 2013 (CN) .......................... 2013 1 0586917

(51) Int. Cl.
G06F 15/16 (2006.01)
H04L 29/08 (2006.01)
(Continued)

(52) U.S. Cl.
CPC .......... H04L 67/1095 (2013.01); H04L 51/10 (2013.01); H04L 63/08 (2013.01);
(Continued)

(58) Field of Classification Search
CPC ......... H04L 51/10; H04L 63/08; H04L 67/02; H04L 67/1095; H04L 67/142; H04L 67/2823; H04L 67/306
See application file for complete search history.

(56) References Cited

U.S. PATENT DOCUMENTS 8,909,712 B2 * 12/2014 Singh ................ G06F 17/30575
709/206
2004/0077334 A1 * 4/2004 Joyce ...................... G06Q 20/00
455/406
(Continued)

FOREIGN PATENT DOCUMENTS

CN    101067819 A    11/2007
CN    101079847 A    11/2007
(Continued)

OTHER PUBLICATIONS

Search Report in International Application No. PCT/CN2014/091584 dated Feb. 27, 2015, 4 pages.
(Continued)

Primary Examiner — Liang Che A Wang
Assistant Examiner — Ayele F Woldemariam
(74) Attorney, Agent, or Firm — Sughrue Mion, PLLC (57) ABSTRACT Method and device for message synchronization are provided. The method includes: receiving a first message posted on a first platform through a first account from the first platform; converting the first message into a second message supported by a second platform; and posting the second message on the second platform through a second account associated with the first account.

15 Claims, 5 Drawing Sheets (51) Int. Cl.
  *H04L 12/58* (2006.01)
  *H04L 29/06* (2006.01)
(52) U.S. Cl.
  CPC ............ *H04L 67/02* (2013.01); *H04L 67/146* (2013.01); *H04L 67/2823* (2013.01); *H04L 67/306* (2013.01)

(56) References Cited

U.S. PATENT DOCUMENTS

| | | | |
|---|---|---|---|
| 2004/0148416 A1* | 7/2004 | Aarnos | H04L 29/12066 709/230 |
| 2013/0304830 A1* | 11/2013 | Olsen | H04L 51/32 709/206 |
| 2014/0012932 A1* | 1/2014 | Sharaf | H04L 51/32 709/206 |
| 2015/0039698 A1* | 2/2015 | Mavalankar | H04L 51/32 709/206 |

FOREIGN PATENT DOCUMENTS

| | | | | |
|---|---|---|---|---|
| CN | 201869222 U | 6/2011 | | |
| CN | 102541918 A | 7/2012 | | |
| CN | 102790725 A | * 11/2012 | ............ | H04L 12/58 |
| CN | 102790725 A | 11/2012 | | |
| CN | 103051646 A | 4/2013 | | |
| CN | 103179021 A | 6/2013 | | |

OTHER PUBLICATIONS

International Preliminary Report on Patentability and Written Opinion in International Application No. PCT/CN2014/091584 dated May 24, 2016, 16 pages.

Communication dated Nov. 28, 2018, from the State Intellectual Property Office of People's Republic of China in counterpart Application No. 201310586917.X.

Communication dated May 28, 2018, from the State Intellectual Property Office of People's Republic of China in counterpart Application No. 201310586917.X.

Communication dated Feb. 28, 2019, from State Intellectual Property Office of the P.R.C. in counterpart application No. 201310586917.X.

* cited by examiner

METHOD AND DEVICE FOR MESSAGE SYNCHRONIZATION

This application is a continuation of International Application No. PCT/CN2014/091584, filed on Nov. 19, 2014. This application claims the benefit and priority of Chinese Patent Application No. 201310586917.X, entitled "Method, Device and System for Message Synchronization" and filed on Nov. 20, 2013. The entire disclosures of each of the above applications are incorporated herein by reference.

TECHNICAL FIELD

The present disclosure relates to network communication technologies, and more particularly to a method and device for message synchronization.

BACKGROUND

A public platform may perform mass texting for accounts subscribing to public accounts. Public accounts authenticated by the public platform are usually accounts of famous persons or enterprises with more attention. Since users applying for public accounts usually apply for microblog accounts on a microblog platform and the microblog accounts usually have an impact on the microblog platform, a message posted on the public platform may be synchronized to the microblog platform to extend the spread of the message.

In a conventional message synchronization method, a user logs on the public platform through a public account, edits a first message manually according to a message format supported by the public platform, and posts the first message on the public platform through the public account. Afterwards, the user logs on the microblog platform through a microblog account, edits a second message whose contents are the same as those of the firs message manually according to a message format supported by the microblog platform, and posts the second message on the microblog platform through the microblog account.

Since the message format supported by the public platform is different from the message format supported by the microblog platform, the user needs to manually edit the second message whose contents are the same as those of the firs message according to the message format supported by the microblog platform, and then post the second message on the microblog platform. In this case, it is inconvenient for the user to synchronize the message posted on the public platform to the microblog platform, thereby resulting in a low message synchronization efficiency.

SUMMARY

Since a message format supported by a public platform is different from a message format supported by a microblog platform, a user needs to manually edit a message whose contents are the same as those of a message posted on the public platform according to the message format supported by the microblog platform, and then post the edited message on the microblog platform. In this case, an efficiency of synchronizing the message posted on the public platform to the microblog platform is low. Accordingly, some embodiments of the present disclosure provide a method and device for message synchronization, which is implemented as follows.

A method for message synchronization is provided according to an embodiment of the present disclosure, which includes:

receiving a first message posted on a first platform through a first account from the first platform;

converting the first message into a second message supported by a second platform; and posting the second message on the second platform through a second account associated with the first account.

A method for message synchronization is provided according to another embodiment of the present disclosure, which includes:

obtaining a first message posted on a first platform through a first account;

sending the first message posted on the first platform to a second platform, wherein the second platform converts the first message into a second message supported by the second platform, and posts the second message on the second platform through a second account associated with the first account.

A device for message synchronization is provided according to another embodiment of the present disclosure, which includes:

a first receiving module, to receive a first message posted on a first platform through a first account from the first platform;

a message converting module, to convert the first message into a second message supported by a second platform; and a message posting module, to post the second message on the second platform through a second account associated with the first account.

In the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on the public platform to the microblog platform can be improved.

BRIEF DESCRIPTION OF THE DRAWINGS

In order to describe solutions provided by the embodiments of the present disclosure clearly, the accompanying drawings referred to in the embodiments will be illustrated briefly hereinafter. Obviously, these accompanying drawings are some embodiments of the present disclosure, and according to these accompanying drawings, those skilled in the art can obtain other accompanying drawings without creative labor.

DETAILED DESCRIPTION

In order to make the technical solution and merits of the present disclosure clearer, the present disclosure will be illustrated in detail hereinafter with reference to the accompanying drawings and specific embodiments.

Figure 1:
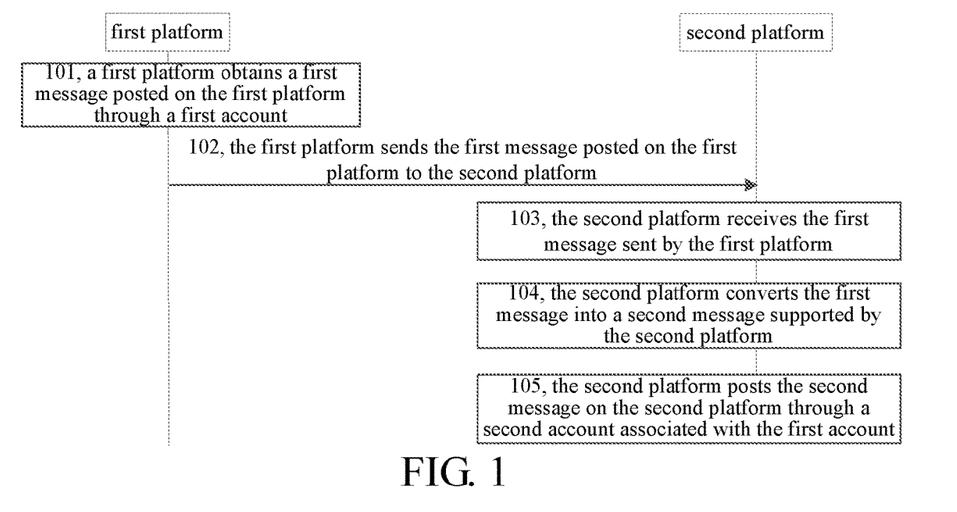
FIG. 1 is a flowchart illustrating a method for message synchronization according to an embodiment of the present disclosure.

FIG. 1 is a flowchart illustrating a method for message synchronization according to an embodiment of the present disclosure. Referring to FIG. 1, the method includes following blocks.

At block 101, a first platform obtains a first message posted on the first platform through a first account.

In an embodiment, the first account is an account authenticated by the first platform. When the first platform is a public platform, the first account may be a public account. For example, the public account may be a serving number for providing services for users or a subscribing number for providing information for users.

After logging on the first platform through the first account, a user edits the first message supported by the first platform, and posts the edited first message on the first platform. The first platform may record the posted first message and the first account posting the first message.

At block 102, the first platform sends the first message posted on the first platform to the second platform.

Since a user applying for the first account usually applies for a second account on the second platform, a second message whose contents are the same as those of the first message may be posted on the second platform through the second account to extend the spread of the first message. In this case, the first platform needs to send the first message posted on the first platform to the second platform. The second account is an account authenticated by the second platform. When the second platform is a microblog platform, the second account may be a microblog account.

In an embodiment, the first platform may send the first message to the second platform via a predefined interface. The predefined interface may be used by the first platform to communicate with the second platform.

At block 103, the second platform receives the first message sent by the first platform.

In an embodiment, the second platform may receive the first message sent by the first platform via a predefined interface.

At block 104, the second platform converts the first message into a second message supported by the second platform.

Since the message format supported by the first platform is different from the message format supported by the second platform, the second platform may convert the first message into the second message supported by the second platform after receiving the first message.

In an embodiment, the second platform may read the contents of the first message, and convert the read contents according to the message format supported by the second platform to generate the second message.

At block 105, the second platform posts the second message on the second platform through a second account associated with the first account.

Before posting the second message, the second platform may determine the second account associated with the first account, and posts the second message through the determined second account. Other users following the second account may read the second message posted through the second account.

Blocks 101 and 102 may be performed by the first platform, and blocks 103 to 105 may be performed by the second platform.

In the method for message synchronization provided by the above embodiments, the first message posted on the first platform is converted into the second message supported by the second platform, and the second message is posted on the second platform. The second message generated through converting the format of the first message can be posted on the second platform. Accordingly, by the embodiments of the present disclosure, an efficiency of synchronizing a message posted on the public platform to the microblog platform can be improved.

Figure 2:
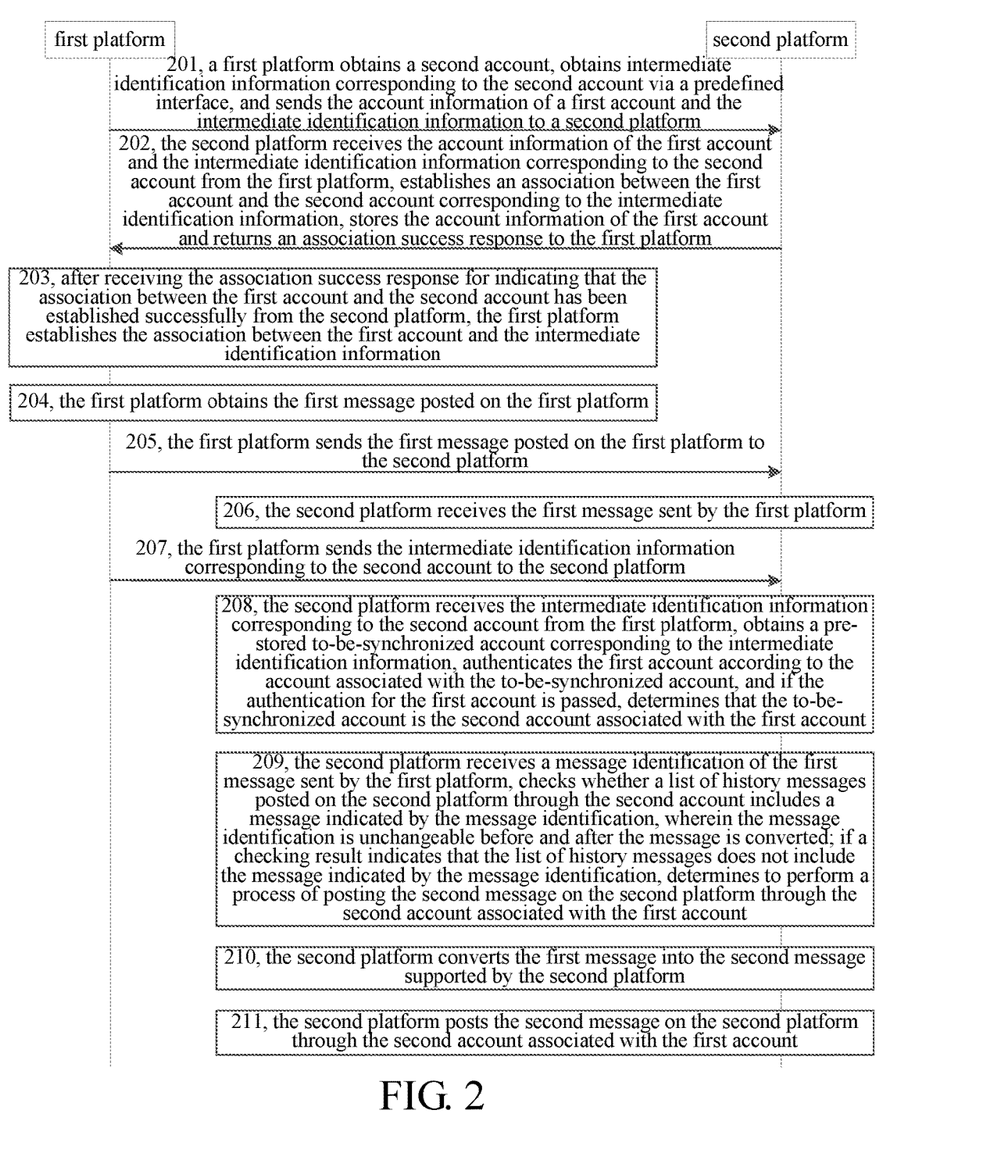
FIG. 2 is a flowchart illustrating a method for message synchronization according to another embodiment of the present disclosure.

FIG. 2 is a flowchart illustrating a method for message synchronization according to another embodiment of the present disclosure. Referring to FIG. 2, the method includes following blocks.

At block 201, a first platform obtains a second account, obtains intermediate identification information corresponding to the second account via a predefined interface, and sends the account information of a first account and the intermediate identification information to a second platform.

The first account is an account authenticated by the first platform. When the first platform is a public platform, the first account may be a public account. For example, the public account may be a serving number for providing services for users or a subscribing number for providing information for users. The second account is an account authenticated by the second platform. When the second platform is a microblog platform, the second account may be a microblog account.

Since a user applying for the first account usually applies for a second account on the second platform, a second message whose contents are the same as those of the first message may be posted on the second platform through the second account to extend the spread of the first message. Accordingly, the first platform and the second platform need to establish an association between the first account and the second account in advance.

In an embodiment, the first platform may establish the association between the first account and the second account after receiving a triggering signal. For example, the first platform may set an option for determining whether to associate the first account with the second account. For example, the first platform may set an option of "associate" on a setting page corresponding to the first account. If the user selects the option of "associate", the first platform may establish the association between the first account and the second account. If the user does not select the option of "associate", the flowchart ends.

If the user applying for the first account does not apply for the second account, a link for applying for the second account may be displayed on the setting page corresponding to the first account, so that the user may enter the second platform through the link and apply for the second account on the second platform. If the user applying for the first account has applied for the second account, an option of "obtaining personal information and buddy relationship of the second account", an option of "sharing contents with the second account" and an option of "obtaining comments of the second account" may be set on the setting page corresponding to the first account. If the user selects these options, the first platform may obtain information corresponding to these options via the predefined interface during a process of establishing the association between the first account and the second account. If the user does not select these options, the first platform does not obtain the information corresponding to these options during the process of establishing the association between the first account and the second account.

In an embodiment, the first platform may obtain the second account according to a predefined mode, and send the account information of the first account to the second platform to establish the association between the first account and the second account. The account information of the first account may be an account name and Quick Response (QR) code of the first account. A process of obtaining the second account according to the predefined mode may include receiving the second account input by the user, or recording the previously-input second account through an application such as a browser and reading the second account recorded in the application.

When the second platform is the microblog platform and the second account is the microblog account, the user may modify the second account at random and the second platform does not maintain the association established according to the second account. Accordingly, the first platform and the second platform both need to reestablish an association according to the modified second account. In this case, processing resources of a server maintaining the first platform will be wasted. Accordingly, intermediate identification information may be configured. The intermediate identification information may be used to associate the first account with the second account, and may be a third account. In this case, an association between the first account and the intermediate identification information may be established on the first platform, and an association between the second account, the intermediate identification information and the first account may be established on the second platform. When the user modifies the second account, the second platform needs to modify the association between the second account and the intermediate identification information, but the first platform does not need to modify the association between the first account and the intermediate identification information, thereby saving the processing resources of the server maintaining the first platform.

In the embodiment, every time the intermediate identification information is modified, the first platform will modify the association between the first account and the intermediate identification information. If the intermediate identification information is not configured, every time the second account is modified, the first platform will modify the association between the first account and the second account. Usually, the frequency of modifying the intermediate identification information is lower than the frequency of modifying the second account. Accordingly, when the intermediate identification information is configured, the processing resources of the server maintaining the first platform can be saved.

In the embodiment, the second platform stores the association between the second account and the intermediate identification information in advance. After obtaining the second account, the first platform may obtain the intermediate identification information corresponding to the second account via the predefined interface, and send the account information of the first account and the intermediate identification information to the second platform, so as to establish the association between the first account and the second account. The predefined interface is used by the first platform to communicate with the second platform.

At block 202, the second platform receives the account information of the first account and the intermediate identification information corresponding to the second account from the first platform, establishes an association between the first account and the second account corresponding to the intermediate identification information, stores the account information of the first account and returns an association success response to the first platform.

The second platform receives the account information of the first account and the intermediate identification information corresponding to the second account via a predefined interface, determines the second account corresponding to the intermediate identification information, and establishes the association between the first account and the second account. The intermediate identification information is information corresponding to the second account that is obtained by the first platform via the predefined interface.

Before establishing the association between the first account and the second account, it is required to check whether the second account is valid. If a checking result indicates that the second account is invalid, the second platform returns an error message to the first platform. If the checking result indicates that the second account is valid, the process of establishing the association between the first account and the second account is performed. An invalid account refers to an account that does not meet a naming rule or belongs to a blacklist.

The process of establishing the association between the first account and the second account corresponding to the intermediate identification information includes:

checking whether there is an account associated with the second account corresponding to the intermediate identification information;

if a checking result indicates that there is an account associated with the second account, releasing a previously-established association between the second account and the associated account, and establishing the association between the first account and the second account; and if the checking result indicates that there is no account associated with the second account, establishing the association between the first account and the second account.

If the second account can be only associated with one first account at the same time, the second platform needs to check whether there is an account associated with the second account after determining the second account. The associated account is an account having an association with the second account.

In an embodiment, the second platform may read a value of a preset association flag bit of the second account, check whether the value meets a predefined condition. If the value meets the predefined condition, the second platform determines that there is an account associated with the second account, releases the association between the second account and the associated account, and establishes the association between the second account and the first account. If the value does not meet the predefined condition, the second platform determines that there is no account associated with the second account, establishes the association between the second account and the first account directly, and modifies the association flag bit of the second account to meet the predefined condition.

There are multiple methods for checking whether the value of the association flag bit meets the predefined condition. For example, the second platform may check whether the value is equal to 1, or check whether the association flag bit is null.

If the second account can be associated with at least two first accounts at the same time, the second platform establishes the association between the second account and the first account directly. If the second platform establishes the association between the second account and the first account for the first time, the second platform needs to modify the association flag bit of the second account to meet the predefined condition.

In an embodiment, the second platform may store the account information of the first account, so as to authenticate the first account according to the account information.

The second platform may send an association success response to the first platform via a predefined interface. The association success response may indicate that the association between the first account and the second account has been established successfully.

At block 203, after receiving the association success response for indicating that the association between the first account and the second account has been established successfully from the second platform, the first platform establishes the association between the first account and the intermediate identification information.

In an embodiment, the first platform receives the association success response from the second platform via the predefined interface, and establishes the association between the first account and the intermediate identification information.

At block 204, the first platform obtains the first message posted on the first platform.

After logging on the first platform through the first account, the user edits the first message, and posts the edited first message on the first platform, and the first platform may record the posted first message and the first account.

At block 205, the first platform sends the first message posted on the first platform to the second platform.

In an embodiment, the second message whose contents are the same as those of the first message may be posted on the second platform through the second account to extend the spread of the first message. In this case, the first platform needs to send the first message posted on the first platform to the second platform. For example, the first platform may send the first message to the second platform via the predefined interface.

If a first message that is not needed to be synchronized is sent to the second platform, transmission resources will be wasted. In order to avoid the waste of transmission resources, the first platform may set an option of determining whether the first message is to be synchronized. For example, the first platform may set an option of "synchronize mass texting to microblog" on a posting page of the first message. If the user selects the option of "synchronize mass texting to microblog", the first platform sends the first message to the second platform after posting the first message. If the user does not select the option of "synchronize mass texting to microblog", the flowchart ends after the first platform posts the first message.

At block 206, the second platform receives the first message sent by the first platform.

In an embodiment, the second platform may receive the first message sent by the first platform via a predefined interface.

At block 207, the first platform sends the intermediate identification information corresponding to the second account to the second platform.

In the embodiment, the second platform may determine the second account associated with the first account, so as to post the second message whose contents are the same as those of the first message through the second account.

If the association between the first account and the second account has been established through the intermediate identification information, the second platform may search for the second account through the intermediate identification information. In this case, the first platform may send the intermediate identification information corresponding to the second account to the second platform via the predefined interface, that is, block 207 is performed.

It should be noted that the first platform may send the intermediate identification information to the second platform together with the first message. Methods for sending the intermediate identification information are not limited in the embodiments.

At block 208, the second platform receives the intermediate identification information corresponding to the second account from the first platform, obtains a pre-stored to-be-synchronized account corresponding to the intermediate identification information, authenticates the first account according to the account associated with the to-be-synchronized account, and if the authentication for the first account is passed, determines that the to-be-synchronized account is the second account associated with the first account.

In order to search out an accurate second account, after obtaining the to-be-synchronized account associated with the first account, the second platform may authenticate the first account according to the account associated with the to-be-synchronized account, and determine that the to-be-synchronized account is the second account associated with the first account after the authentication for the first account is passed.

Before authenticating the first account according to the account associated with the to-be-synchronized account, it is required to check whether the to-be-synchronized account is valid. If a checking result indicates that the to-be-synchronized account is invalid, the second platform returns an error message to the first platform. If the checking result indicates that the to-be-synchronized account is valid, the process of authenticating the first account according to the account associated with the to-be-synchronized account is performed. An invalid account refers to an account that does not meet a naming rule or belongs to a blacklist.

In an embodiment, the process of authenticating the first account according to the account associated with the to-be-synchronized account includes:

checking whether there is the account associated with the to-be-synchronized account;

if a checking result indicates that there is the account associated with the to-be-synchronized account, obtaining the associated account;

checking whether the first account is the same as the associated account; and if a checking result indicates that the first account is the same as the associated account, determining that the authentication for the first account is passed.

In an embodiment, the second platform may check whether there is the account associated with the to-be-synchronized account according to an association flag bit of the to-be-synchronized account. If the association flag bit does not meet a predefined condition, the second platform determines that there is no account associated with the to-be-synchronized account. In this case, the second platform returns an error message to the first platform. If the association flag bit meets the predefined condition, the second platform determines that there is the account associated with the to-be-synchronized account, and then checks whether the associated account is the first account. If the associated account is the first account, the authentication for the first account is passed, and the second platform determines that the to-be-synchronized account is the second account associated with the first account. If the associated account is not the first account, the second platform returns an error message to the first platform.

If the association between the first account and the second account has not been established through the intermediate identification information, the second platform may determine the to-be-synchronized account according to the account information of the first account. The second platform authenticates the first account according to the account associated with the to-be-synchronized account. If the authentication for the first account is passed, the second platform determines that the to-be-synchronized account is the second account associated with the first account. The method for authenticating the first account by the second platform has been described above and will not be described herein.

At block 209, the second platform receives a message identification of the first message sent by the first platform, checks whether a list of history messages posted on the second platform through the second account includes a message indicated by the message identification, wherein the message identification is unchangeable before and after the message is converted; if a checking result indicates that the list of history messages does not include the message indicated by the message identification, determines to perform a process of posting the second message on the second platform through the second account associated with the first account.

In order to avoid repeatedly posting the second message through the second account when repeatedly posting the first message through the first account, the second platform may check, before posting the second message, whether the second message has been posted through the second account. If a checking result indicates that the second message has been posted through the second account, the second platform forbids posting the second message. If the checking result indicates that the second message has not been posted through the second account, the second platform posts the second message, that is, block 210 is performed.

Since the message format supported by the first platform is different from the message format supported by the second platform, the second platform needs to convert the first message into the second message supported by the second platform after receiving the first message. If it is found that the checking result indicates to forbid posting the second message after the first message is converted into the second message, conversion resources will be wasted. In order to avoid the waste of conversion resources, the second platform may check, before converting the first message into the second message, whether the second message has been posted through the second account.

In an embodiment, the second platform may receive the message identification of the first message via the predefined interface. The message identification is unchangeable before and after the first message is converted. Accordingly, the message identification is also a message identification of the second message. Since the second platform may record posted messages and the second account posting the messages and generate the list of history messages, the second platform may check whether the list of history messages includes the message indicated by the message identification. If a checking result indicates that the list of history messages includes the message indicated by the message identification, the second platform returns an error message to the first platform. If the checking result indicates that the list of history messages does not include the message indicated by the message identification, block 210 is performed.

At block 210, the second platform converts the first message into the second message supported by the second platform.

In an embodiment, the second platform may read the contents of the first message, and convert the read contents according to the message format supported by the second platform to generate the second message.

The process of converting the first message into the second message supported by the second platform is implemented as follows.

If the first message is a picture message, a first Uniform Resource Locator (URL) of each picture included in the first message is converted into a second URL supported by the second platform, and the second message is generated according to each second URL.

If the first message is a text message, a conversion mode of the first message is determined according to the number of characters included in the first message, and the first message is converted into the second message according to the determined conversion mode.

If the first message is a picture-text message, a first URL of each first picture included in the first message is converted into a second URL supported by the second platform, a third URL of a second picture is generated according to the characters included in the first message, and the second message is generated according to each second URL and the third URL.

If the first message is the picture message, the second platform may upload each picture to a preset picture database, and the second URL is generated when the picture database saves the picture, thereby converting the first URL into the second URL. After all pictures are saved in the picture database, all second URLs are combined into the second message. The first URL is supported by the first platform, and the second URL is supported by the second platform.

Since the second platform only converts the first URL of the picture but does not process the picture, the display of the picture after the first URL is converted is the same as the display of the picture before the first URL is converted, thereby improving the accuracy of picture message synchronization.

The second platform prescribes that the number of characters included in each second message is smaller than or equal to a predefined threshold. Accordingly, if the first message is a text message and the number of characters included in the first message is smaller than or equal to the predefined threshold, the second platform generates the second message with text form according to the characters included in the first message.

If the number of characters included in the first message is larger than the predefined threshold, the second platform cannot generate the second message with text form according to the characters included in the first message. In order to solve a problem that the first message whose character number is larger than the predefined threshold cannot be synchronized, the second platform may convert the characters included in the first message into a picture, and then generate the second message with text form.

Accordingly, the second platform needs to determine the conversion mode of the first message according to the number of characters included in the first message, and convert the first message into the second message according to the determined conversion mode.

Since the second platform generates the second message with picture form according to the characters included in the first message rather than cut the characters, the contents of the second message are the same as the contents of the first message, thereby improving the accuracy of text message synchronization.

If the first message is a picture-text message, the second platform may upload each first picture to the preset picture database, and generate the second URL when the picture database saves the first picture, thereby converting the first URL into the second URL. The second platform generates a long microblog according to the characters included in the first message, and generates the third URL of the second picture. The second platform combines each second URL and the third URL and performs screenshot to obtain the second message.

If the first message includes at least two picture-text messages, the second platform performs screenshot on each picture-text message, and combines fourth URLs of all pictures obtained through screenshot into the second message.

The second platform converts the first URL of the first picture but does not process the first picture, so the display of the first picture after the first URL is converted is the same as the display of the first picture before the first URL is converted. The second platform generates the second message with picture form according to the characters included in the first message, so that the display of the second message is the same as the display of the first message, thereby improving the accuracy of the picture-text message synchronization.

At block 211, the second platform posts the second message on the second platform through the second account associated with the first account.

In an embodiment, the second platform may post the second message through the second account. The second account may also post the second message together with the account information of the first account, so that another user browsing the second message may establish an association between the first account and an account of the user on the first platform according to the account information of the first account, and interact with the first account on the first platform, so as to extend the spread of the message posted through the first account.

The process of posting the second message on the second platform through the second account associated with the first account includes:

obtaining pre-stored account information of the first account; and posting the second message together with the account information of the first account on the second platform through the second account.

In order to simplify the process of establishing an association between the first account and the account of another user browsing the second message on the first platform, a QR code in the account information of the first account and the second message may be posted. For example, the second platform may display the second message on an interface, and display the QR code and characters of "post the first message through the first account named XX, click the scan the QR code to follow the first account" on a location of the interface.

In an embodiment of the present disclosure, an option of determining whether to post the account information may be set. For example, an option of "display an associated public account on a personal microblog page" may be set in the setting information of the second account. If the user selects the option, the second platform posts the second message and the account information of the associated public account through the second account. If the user does not select the option, the second platform only posts the second message through the second account.

Blocks 201, 203, 204, 205 and 207 may be performed by the first platform, and blocks 202, 206 and 208 to 211 may be performed by the second platform.

In the method for message synchronization provided by the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on the public platform to the microblog platform can be improved. Through posting the second message and the account information of the first account through the second account, another user browsing the second message may establish an association between the first account and an account of the user on the first platform according to the account information of the first account, and interact with the first account on the first platform, so as to extend the spread of the message posted through the first account.

Figure 3:
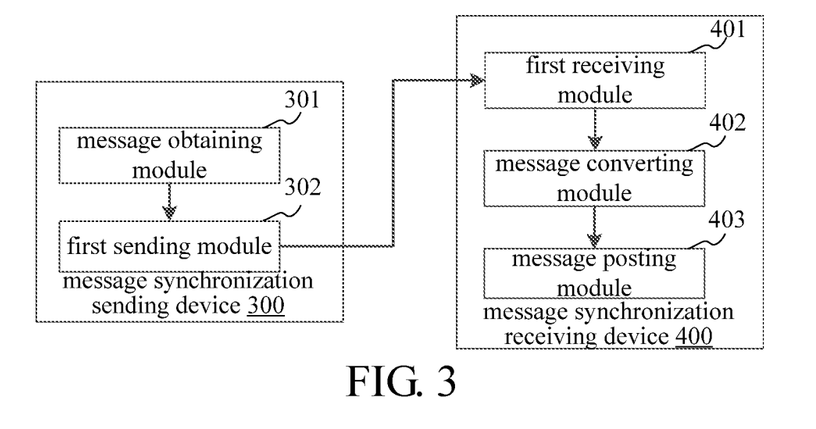
FIG. 3 is a diagram illustrating the structure of a system for message synchronization according to an embodiment of the present disclosure.

FIG. 3 is a diagram illustrating the structure of a system for message synchronization according to an embodiment of the present disclosure. Referring to FIG. 3, the system for message synchronization may include a message synchronization sending device 300 and a message synchronization receiving device 400. The message synchronization sending device 300 may include a message obtaining module 301 and a first sending module 302. The message synchronization sending device 300 may be implemented as a part or all of a server through software, hardware or combination of software and hardware. The message synchronization receiving device 400 may include a first receiving module 401, a message converting module 402 and a message posting module 403. The message synchronization receiving device 400 may be implemented as a part or all of a client device through software, hardware or combination of software and hardware.

The message obtaining module 301 may obtain a first message posted on a first platform through a first account.

The first sending module 302 may send the first message obtained by the message obtaining module 301 to a second platform.

The first receiving module 401 may receive the first message sent by the first platform.

The message converting module 402 may convert the first message received by the first receiving module 401 into a second message supported by the second platform.

The message posting module 403 may post the second message on the second platform through a second account associated with the first account.

In the system for message synchronization provided by the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on a public platform to a microblog platform can be improved.

Figure 4:
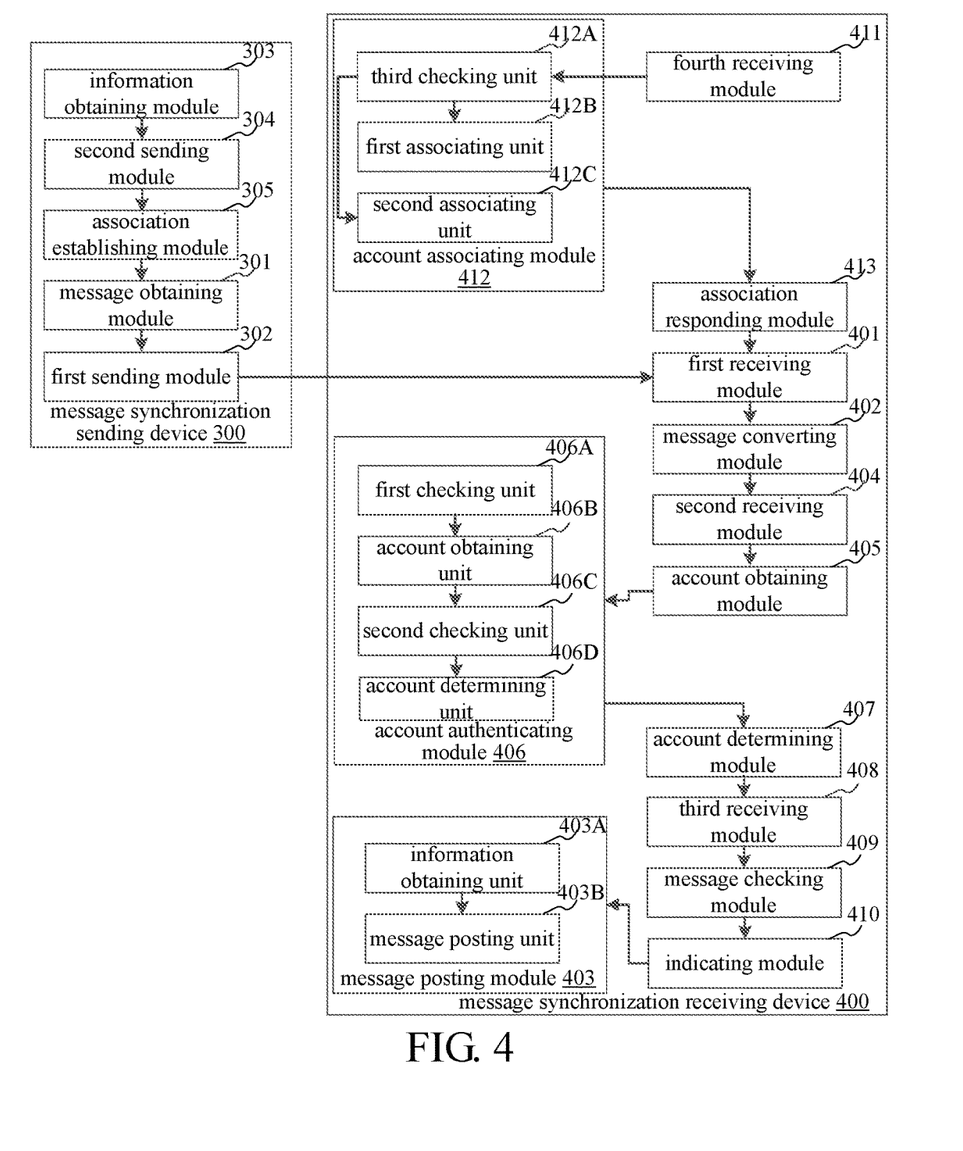
FIG. 4 is a diagram illustrating the structure of a system for message synchronization according to another embodiment of the present disclosure.

FIG. 4 is a diagram illustrating the structure of a system for message synchronization according to another embodiment of the present disclosure. Referring to FIG. 4, the system for message synchronization may include a message synchronization sending device 300 and a message synchronization receiving device 400. The message synchronization sending device 300 may include a message obtaining module 301 and a first sending module 302. The message synchronization sending device 300 may be implemented as a part or all of a server through software, hardware or combination of software and hardware. The message synchronization receiving device 400 may include a first receiving module 401, a message converting module 402 and a message posting module 403. The message synchronization receiving device 400 may be implemented as a part or all of a client through software, hardware or combination of software and hardware.

The message obtaining module 301 may obtain a first message posted on a first platform through a first account.

The first sending module 302 may send the first message obtained by the message obtaining module 301 to a second platform.

The first receiving module 401 may receive the first message sent by the first platform.

The message converting module 402 may convert the first message received by the first receiving module 401 into a second message supported by the second platform.

The message posting module 403 may post the second message on the second platform through a second account associated with the first account.

In an embodiment, if the first message is a picture message, the message converting module 402 may convert a first URL of each picture included in the first message into a second URL supported by the second platform, and generate the second message according to each second URL. If the first message is a text message, the message converting module 402 may determine a conversion mode of the first message according to the number of characters included in the first message, and convert the first message into the second message according to the determined conversion mode. If the first message is a picture-text message, the message converting module 402 may convert a first URL of each first picture included in the first message into a second URL supported by the second platform, generate a third URL of a second picture according to the characters included in the first message, and generate the second message according to each second URL and the third URL.

In an embodiment, the message synchronization receiving device 400 may further include a second receiving module 404, an account obtaining module 405, an account authenticating module 406 and an account determining module 407.

Before the message posting module 403 posts the second message on the second platform through the second account associated with the first account, the second receiving module 404 may receive intermediate identification information corresponding to the second account from the first platform.

The account obtaining module 405 may obtain a pre-stored to-be-synchronized account corresponding to the intermediate identification information.

The account authenticating module 406 may authenticate the first account according to an account associated with the to-be-synchronized account.

The account determining module 407 may determine that the to-be-synchronized account is the second account associated with the first account when the authentication for the first account is passed.

In an embodiment, the account authenticating module 406 may include a first checking unit 406A, an account obtaining unit 406B, a second checking unit 406C and an account determining unit 406D.

The first checking unit 406A may check whether there is the account associated with the to-be-synchronized account.

The account obtaining unit 406B may obtain the associated account when a checking result obtained by the first checking unit 406A indicates that there is the account associated with the to-be-synchronized account.

The second checking unit 406C may check whether the first account is the same as the associated account.

The account determining unit 406D may determine that the authentication for the first account is passed when a checking result obtained by the second checking unit 406C indicates that the first account is the same as the associated account.

In an embodiment, the message synchronization receiving device 400 may further include a third receiving module 408, a message checking module 409 and an indicating module 410.

Before the message posting module 403 posts the second message on the second platform through the second account associated with the first account, the third receiving module 408 may receive a message identification of the first message from the first platform.

The message checking module 409 may check whether a list of history messages posted on the second platform through the second account includes a message indicated by the message identification, wherein the message identification is unchangeable before and after the message is converted.

The indicating module 410 may indicate the message posting module 403 to post the second message on the second platform through the second account associated with the first account if a checking obtained by the message checking module 409 indicates that the list of history messages does not include the message indicated by the message identification.

In an embodiment, the message synchronization receiving device 400 may further include a fourth receiving module 411, an account associating module 412 and an association responding module 413.

Before the first receiving module 401 receives the first message posted on the first platform, the fourth receiving module 411 may receive the account information of the first account and the intermediate identification information corresponding to the second account from the first platform, wherein the intermediate identification information is information corresponding to the second account that is obtained by the first platform via a predefined interface.

The account associating module 412 may establish an association between the first account and the second account corresponding to the intermediate identification information, and store the account information of the first account.

The association responding module 413 may return an association success response to the first platform when the account associating module 412 successfully establishes the association between the first account and the second account, wherein the association success response may indicate the first platform to establish an association between the first account and the intermediate identification information.

In an embodiment, the account associating module 412 may include a third checking unit 412A, a first associating unit 412B and a second associating unit 412C.

The third checking unit 412A may check whether there is an account associated with the second account corresponding to the intermediate identification information.

If a checking obtained by the third checking unit 412A indicates that there is an associated account, the first associating unit 412B releases the previously-established association between the second account and the associated account, and then establishes the association between the second account and the first account.

If the checking obtained by the third checking unit 412A indicates that there is no associated account, the second associating unit 412C establishes the association between the second account and the first account.

In an embodiment, the message posting module 403 may include an information obtaining unit 403A and a message posting unit 403B.

The information obtaining unit 403A may obtain pre-stored account information of the first account.

The message posting unit 403B may post the account information of the first account and the second message on the second platform through the second account.

In an embodiment, the message synchronization sending device 300 may further include an information obtaining module 303, a second sending module 304 and an association establishing module 305.

The information obtaining module 303 may obtain the second account before the message obtaining module 301 obtains the first message posted on the first platform, and obtain the intermediate identification information corresponding to the second account via a predefined interface.

The second sending module 304 may send the account information of the first account and the intermediate identification information to the second platform.

The association establishing module 305 may establish the association between the first account and the intermediate identification information after receiving the association success response returned by the association responding module 413.

In an embodiment, the message synchronization sending device 300 may further include a third sending module.

The third sending module may send the intermediate identification information corresponding to the second account to the second platform after the message obtaining module 301 obtains the first message posted on the first platform, so that the message posting module 403 may post the second message.

In the system for message synchronization provided by the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on the public platform to the microblog platform can be improved. Through posting the second message and the account information of the first account through the second account, another user browsing the second message may establish an association between the first account and an account of the user on the first platform according to the account information of the first account, and interact with the first account on the first platform, so as to extend the spread of the message posted through the first account.

Figure 5:
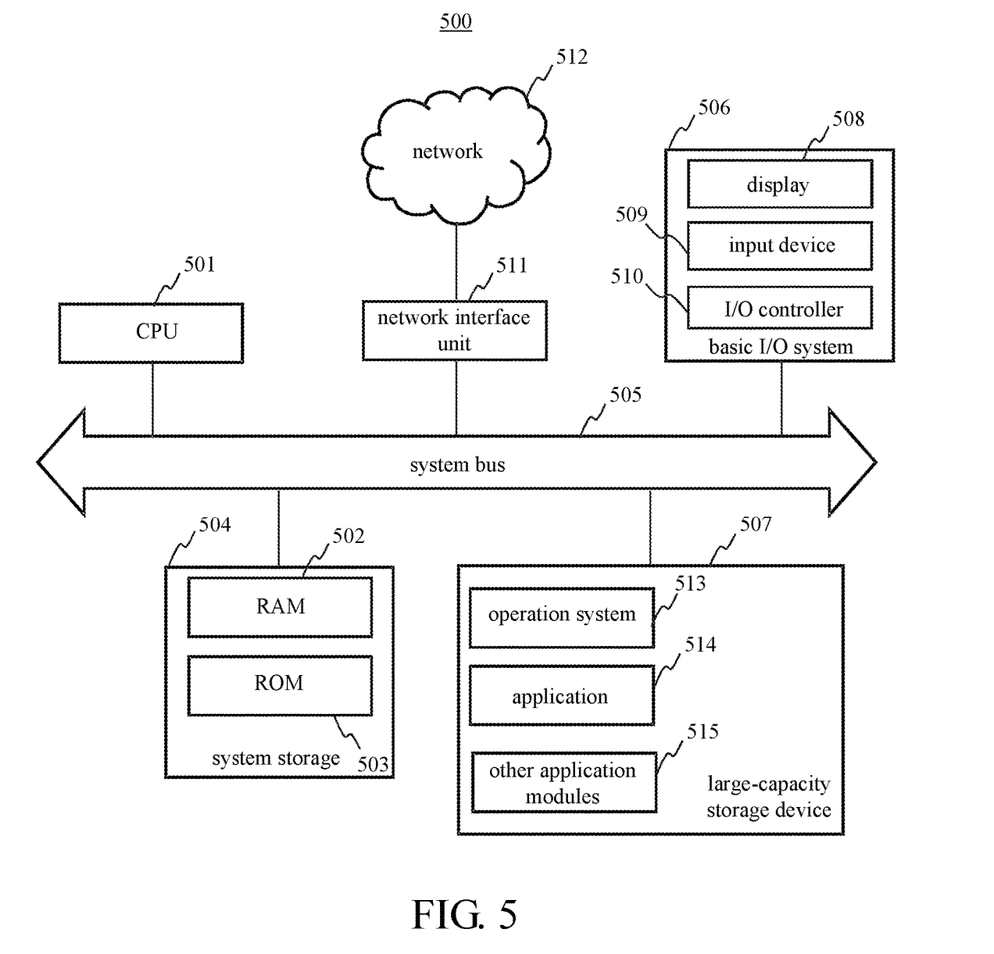
FIG. 5 is a diagram illustrating the structure of a server according to an embodiment of the present disclosure.

FIG. 5 is a diagram illustrating the structure of a server according to an embodiment of the present disclosure. The server 500 may be implemented as a first platform or a second platform. Referring to FIG. 5, the server 500 includes a Central Processing Unit (CPU) 501, a system storage 504 including a Random Access Memory (RAM) 502 and a Read-Only Memory (ROM) 503, and a system bus 505 through which the CPU 501 and the system storage 504 are connected. The server 500 further includes a basic Input/Output (I/O) system 506 for transmitting information between components in a computer, and a large-capacity storage device 507 for storing an operation system 513, an application 514 and other application modules 515.

The basic I/O system 506 includes a display 508 for displaying information and an input device 509 for inputting information by a user, such as a mouse and a keyboard. The display 508 and the input device 509 are both connected to the CPU 501 via an I/O controller 510 connected to the system bus 505. The basic I/O system 506 further includes the I/O controller 510 to receive and process input from multiple other devices including the keyboard, the mouse or an electric stylus. Similarly, the I/O controller 510 also provides an output device for outputting information to a display screen, a printer or other types of output devices.

The large-capacity storage device 507 is connected to the CPU 501 through a large-capacity storage controller (not shown in Figures) connected to the system bus 505. The large-capacity storage device 507 and a computer readable storage medium may provide non-transitory storage for the server 500. That is, the large-capacity storage device 507 may include a computer readable storage medium (not shown in Figures) such as a hard disk or a CD-ROM driver.

The computer readable storage medium may include a computer storage medium and a communication medium. The computer storage medium includes a transitory, non-transitory, movable and unmovable medium for storing computer readable instructions, data structures, application modules or other data, which can be implemented by any method or technology. The computer storage medium includes RAM, ROM, EPROM, EEPROM, flash memory or other solid state storage technologies, CD-ROM, DVD or other optic storage, magnetic tape box, magnetic tape, magnetic disk storage or other magnetic storage device. Of cause, those skilled in the art can understand that the computer storage medium is not limited to the above mentioned. The system storage 504 and the large-capacity storage device 507 are called storage.

According to the embodiments of the present disclosure, the server 500 may be connected to a remote computer through a network such as Internet. That is, the server 500 may be connected to a network 512 through a network interface unit 511 connected to the system bus 505, or may be connected to other networks or remote computer systems (not shown in Figures) through the network interface unit 511.

The storage further includes one or more applications. The one or more applications are stored in the storage and are may be executed by one or more CPUs 501.

When the server 500 is implemented as the second platform, the one or more applications have following functions of:

receiving a first message posted on a first platform through a first account from the first platform;

converting the first message into a second message supported by a second platform; and posting the second message on the second platform through a second account associated with the first account.

In an embodiment, the process of converting the first message into the second message supported by the second platform is implemented as follows.

If the first message is a picture message, a first URL of each picture included in the first message is converted into a second URL supported by the second platform, and the second message is generated according to each second URL.

If the first message is a text message, a conversion mode of the first message is determined according to the number of characters included in the first message, and the first message is converted into the second message according to the determined conversion mode.

If the first message is a picture-text message, a first URL of each first picture included in the first message is converted into a second URL supported by the second platform, and a third URL of a second picture is generated according to the characters included in the first message, and the second message is generated according to each second URL and the third URL.

In an embodiment, before posting the second message on the second platform through the second account associated with the first account, the one or more applications further have following functions of:

receiving intermediate identification information corresponding to the second account from the first platform;

obtaining a pre-stored to-be-synchronized account corresponding to the intermediate identification information;

authenticating the first account according to an account associated with the to-be-synchronized account; and determining that the to-be-synchronized account is the second account associated with the first account if the authentication for the first account is passed.

In an embodiment, the process of authenticating the first account according to the account associated with the to-be-synchronized account includes:

checking whether there is the account associated with the to-be-synchronized account;

obtaining the associated account if a checking result indicates that there is the account associated with the to-be-synchronized account;

checking whether the first account is the same as the associated account; and determining that the authentication for the first account is passed if a checking result indicates that the first account is the same as the associated account.

In an embodiment, before posting the second message on the second platform through the second account associated with the first account, the one or more applications further have following functions of:

receiving a message identification of the first message from the first platform;

checking whether a list of history messages posted on the second platform through the second account includes a message indicated by the message identification, wherein the message identification is unchangeable before and after the message is converted; and performing the process of posting the second message on the second platform through the second account associated with the first account if a checking result indicates that the list of history messages does not include the message indicated by the message identification.

In an embodiment, before receiving the first message posted on the first platform from the first platform, the one or more applications further have following functions of:

receiving the account information of the first account and the intermediate identification information corresponding to the second account from the first platform, wherein the intermediate identification information is information corresponding to the second account that is obtained by the first platform via a predefined interface; and establishing an association between the first account and the second account corresponding to the intermediate identification information, and saving the account information of the first account; and returning an association success response to the first platform, wherein the association success response may indicate the first platform to establish an association between the first account and the intermediate identification information.

In an embodiment, a process of establishing the association between the first account and the second account corresponding to the intermediate identification information includes:

checking whether there is an account associated with the second account corresponding to the intermediate identification information;

if a checking result indicates that there is an associated account, releasing a previously-established association between the second account and the associated account, and then establishing the association between the second account and the first account; and if the checking result indicates that there is no associated account, establishing the association between the second account and the first account.

In an embodiment, a process of posting the second message on the second platform through the second account associated with the first account includes:

obtaining pre-stored account information of the first account; and posting the account information of the first account and the second message on the second platform through the second account.

When the server 500 is implemented as the first platform, the one or more applications have following functions of:

obtaining the first message posted on the first platform through the first account;

sending the first message posted on the first platform to the second platform, wherein the second platform converts the first message into the second message supported by the second platform, and posts the second message on the second platform through the second account associated with the first account.

In an embodiment, before obtaining the first message posted on the first platform through the first account, the one or more applications further have following functions of:

obtaining the second account, and obtaining the intermediate identification information corresponding to the second account via a predefined interface;

sending the account information of the first account and the intermediate identification information to the second platform; and establishing an association between the first account and the intermediate identification information after receiving an association success response returned by the second platform, wherein the association success indicates that the association between the first account and the second account has been established successfully.

The one or more applications further have following functions of:

sending the intermediate identification information corresponding to the second account to the second platform.

In the server provided by the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on the public platform to the microblog platform can be improved. Through posting the second message and the account information of the first account through the second account, another user browsing the second message may establish an association between the first account and an account of the user on the first platform according to the account information of the first account, and interact with the first account on the first platform, so as to extend the spread of the message posted through the first account.

Figure 6:
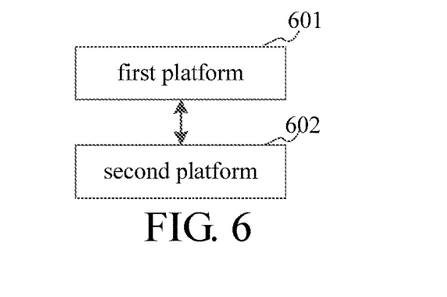
FIG. 6 is a diagram illustrating the structure of a system for message synchronization according to another embodiment of the present disclosure.

FIG. 6 is a diagram illustrating the structure of a system for message synchronization according to another embodiment of the present disclosure. Referring to FIG. 6, the system for message synchronization may include a first platform 601 and a second platform 602.

In an embodiment, the first platform 601 includes the message synchronization receiving apparatus shown in FIG. 3, and the second platform 602 includes the message synchronization sending apparatus shown in FIG. 3.

In another embodiment, the first platform 601 includes the message synchronization receiving apparatus shown in FIG. 4, and the second platform 602 includes the message synchronization sending apparatus shown in FIG. 4.

The first platform 601 may be a public platform, and the second platform 602 may be a microblog platform.

In the system for message synchronization provided by the embodiments of the present disclosure, the first message posted on the first platform is converted into the second message supported by the second platform, and then the second message is posted on the second platform. The second message generated through converting the format of the first message can be posted on the second platform. Accordingly, by the embodiments of the present disclosure, an efficiency of synchronizing a message posted on the public platform to the microblog platform can be improved. Through posting the second message and the account information of the first account through the second account, another user browsing the second message may establish an association between the first account and an account of the user on the first platform according to the account information of the first account, and interact with the first account on the first platform, so as to extend the spread of the message posted through the first account.

The functions of the message synchronization sending device, the message synchronization receiving device and the message synchronization system provided by the above embodiments have been described according to the above mentioned modules. In an actual application, the functions may be implemented by different modules. That is, the modules of the message synchronization sending device, the message synchronization receiving device and the message synchronization system may be different from the above mentioned modules, thereby implementing part or all of the above functions. In addition, the message synchronization sending device, the message synchronization receiving device, the message synchronization system and the message synchronization method belong to the same solution, referring to the above method embodiments, and will not be described herein.

Sequence number in above embodiments of the present disclosure is only used for descriptions, which don't demonstrate good or better embodiment.

Those skilled in the art can understand that all or part of steps in the embodiments of the present disclosure can be implemented by hardware, or by instructing related hardware by a program, the program may be stored in a readable storage medium of a computer. The readable storage medium includes a ROM/RAM, a disk, a Compact Disc (CD) and so on.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for message synchronization, comprising:
   receiving account information of a first account and intermediate identification information corresponding to a second account from a first platform, wherein the intermediate identification information is information corresponding to the second account that is obtained by the first platform via a predefined interface;
   establishing an association between the first account and the second account corresponding to the intermediate identification information, and saving the account information of the first account;
   receiving a first message posted on the first platform through the first account from the first platform;
   converting the first message into a second message supported by a second platform;
   receiving a message identification of the first message from the first platform, wherein the message identification is unchangeable before and after the first message is converted; and
   performing a process of posting the second message on the second platform through the second account associated with the first account in response to determining that a list of history messages posted on the second platform through the second account does not include the message indicated by the message identification,
   wherein the converting the first message into the second message supported by the second platform comprises:
      in response to determining that the first message is a picture message, obtaining a picture included in the picture message, storing the picture to a preset picture database to convert a first Uniform Resource Locator (URL) of the picture included in the picture message to a second URL of the picture in the preset picture database, and generating the second message to include the picture according to the second URL of the picture, and
      in response to determining that a number of characters included in the first message being larger than a predefined threshold, converting the characters included in the first message into a picture, and generating the second message in a text form based on conversion of the characters included in the first message into the picture.

2. The method of claim 1, wherein the converting the first message into the second message supported by the second platform further comprises:
   in response to determining that the first message is a picture-text message, obtaining a picture included in the picture-text message, storing the picture to the preset picture database to convert a third URL of the picture included in the picture-text message to a fourth URL of the picture, generating a fifth URL of a second picture according to characters of text included in the picture-text message, and generating the second message to include the picture and the text based on the fourth URL and the fifth URL.

3. The method of claim 1, before posting the second message on the second platform through the second account associated with the first account, further comprising:
obtaining a pre-stored to-be-synchronized account corresponding to the intermediate identification information;
authenticating the first account according to an account associated with the to-be-synchronized account; and
determining that the to-be-synchronized account is the second account associated with the first account when authentication for the first account is passed.

4. The method of claim 3, wherein the authenticating the first account according to the account associated with the to-be-synchronized account comprises:
determining whether there is the account associated with the to-be-synchronized account;
obtaining the associated account in response to determining that there is the account associated with the to-be-synchronized account;
determining whether the first account is the same as the associated account; and
determining that the authentication for the first account is passed in response to determining that the first account is the same as the associated account.

5. The method of claim 1, before receiving the first message posted on the first platform through the first account from the first platform, further comprising:
returning an association success response to the first platform, wherein the association success response indicates the first platform to establish an association between the first account and the intermediate identification information.

6. The method of claim 5, wherein the establishing the association between the first account and the second account corresponding to the intermediate identification information comprises:
determining whether there is an account associated with the second account corresponding to the intermediate identification information;
in response to determining that there is an associated account, releasing a previously-established association between the second account and the associated account, and establishing the association between the second account and the first account; and
in response to determining that there is no associated account, establishing the association between the second account and the first account.

7. The method of claim 1, wherein the posting the second message on the second platform through the second account associated with the first platform comprises:
obtaining pre-stored account information of the first account; and
posting the account information of the first account and the second message on the second platform through the second account.

8. A method for message synchronization, comprising:
obtaining a second account, and obtaining intermediate identification information corresponding to the second account via a predefined interface;
sending account information of a first account and the intermediate identification information to a second platform;
establishing an association between the first account and the intermediate identification information after receiving an association success response returned by the second platform, wherein the association success response indicates that an association between the first account and the second account has been established successfully;
obtaining a first message posted on a first platform through the first account;
sending the intermediate identification information corresponding to the second account to the second platform;
sending the first message posted on the first platform to the second platform, wherein the second platform converts the first message into a second message supported by the second platform, and posts the second message on the second platform through the second account associated with the first account;
wherein the second platform converting the first message into the second message supported by the second platform comprises:
in response to determining that the first message is a picture message, obtaining a picture included in the picture message, storing the picture to a preset picture database to convert a first Uniform Resource Locator (URL) of the picture included in the picture message to a second URL of the picture in the preset picture database, and generating the second message to include the picture according to the second URL of the picture; and
in response to determining that a number of characters included in the first message being larger than a predefined threshold, converting the characters included in the first message into a picture, and generating the second message in a text form based on conversion of the characters included in the first message into the picture.

9. A device for message synchronization, comprising:
at least one processor; and
at least one memory storing instructions executable by the at least one processor to cause the at least one processor to:
receive account information of a first account and intermediate identification information corresponding to a second account from a first platform before receiving a first message posted on the first platform, wherein the intermediate identification information is information corresponding to the second account that is obtained by the first platform via a predefined interface;
establish an association between the first account and the second account corresponding to the intermediate identification information, and save the account information of the first account;
receive the first message posted on the first platform through the first account from the first platform;
convert the first message into a second message supported by a second platform;
receive a message identification of the first message from the first platform before posting the second message on the second platform through the second account associated with the first account, wherein the message identification is unchangeable before and after the first message is converted;
perform a process of posting the second message on the second platform through the second account associated with the first account in response to determining that a list of history messages posted on the second platform through the second account does not include the message indicated by the message identification; and post the second message on the second platform through a second account associated with the first account;

wherein converting the first message into the second message supported by the second platform comprises:
in response to determining that the first message is a picture message, obtaining a picture included in the picture message, storing the picture to a preset picture database to convert a first Uniform Resource Locator (URL) of the picture included in the picture message to a second URL of the picture in the preset picture database, and generating the second message to include the picture according to the second URL of the picture; and
in response to determining that a number of characters included in the first message being larger than a predefined threshold, converting the characters included in the first message into a picture, and generating the second message in a text form based on conversion of the characters included in the first message into the picture.

10. The device of claim 9, wherein, converting the first message into the second message supported by the second platform comprises:
in response to determining that the first message is a picture-text message, obtaining a picture included in the picture-text message, storing the picture to the preset picture database to convert a third URL of the picture included in the picture-text message to a fourth URL of the picture, generating a fifth URL of a second picture according to characters of text included in the picture-text message, and generate the second message to include the picture and the text according to the fourth URL and the fifth URL.

11. The device of claim 9, wherein the instructions executable by the at least one processor further cause the at least one processor to:
obtain a pre-stored to-be-synchronized account corresponding to the intermediate identification information;
authenticate the first account according to an account associated with the to-be-synchronized account; and
determine that the to-be-synchronized account is the second account associated with the first account when authentication for the first account is passed.

12. The device of claim 11, wherein authenticating the first account according to the account associated with the to-be-synchronized account comprises:
determining whether there is the account associated with the to-be-synchronized account;
obtaining the associated account in response to determining that there is the account associated with the to-be-synchronized account;
determining whether the first account is the same as the associated account; and
determining that the authentication for the first account is passed in response to determining that the first account is the same as the associated account.

13. The device of claim 9, wherein the instructions executable by the at least one processor further cause the at least one processor to:
return an association success response to the first platform, wherein the association success response indicates the first platform to establish an association between the first account and the intermediate identification information.

14. The device of claim 13, wherein establishing the association between the first account and the second account corresponding to the intermediate identification information comprises:
determining whether there is an account associated with the second account corresponding to the intermediate identification information;
in response to determining that there is an associated account, releasing a previously-established association between the second account and the associated account, and establishing the association between the second account and the first account; and
in response to determining that there is no associated account, establishing the association between the second account and the first account.

15. The device of claim 9, wherein posting the second message on the second platform through the second account associated with the first platform comprises:
obtaining pre-stored account information of the first account; and
posting the account information of the first account and the second message on the second platform through the second account.

* * * * *